(12) United States Patent
Grant (10) Patent No.: US 9,191,404 B2
(45) Date of Patent: Nov. 17, 2015

(54) PROBABILISTIC FLOW MANAGEMENT

(71) Applicant: Cisco Technology, Inc., San Jose, CA (US)

(72) Inventor: Clinton Grant, Artarmon (AU)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 13/910,182

(22) Filed: Jun. 5, 2013

(65) Prior Publication Data

US 2014/0365418 A1    Dec. 11, 2014

(51) Int. Cl.
| | |
|---|---|
| G06F 9/44 | (2006.01) |
| G06N 7/02 | (2006.01) |
| G06N 7/06 | (2006.01) |
| H04L 29/06 | (2006.01) |
| H04L 12/721 | (2013.01) |
| H04L 12/859 | (2013.01) |

(52) U.S. Cl.
CPC ............ *H04L 63/1441* (2013.01); *H04L 45/38* (2013.01); *H04L 47/2475* (2013.01)

(58) Field of Classification Search
USPC .......................................................... 706/52
See application file for complete search history.

(56) References Cited

U.S. PATENT DOCUMENTS

| | | | | |
|---|---|---|---|---|
| 7,525,969 | B2 * | 4/2009 | Grant | 370/392 |
| 7,954,163 | B2 * | 5/2011 | Smith | 726/28 |
| 8,307,422 | B2 * | 11/2012 | Varadhan et al. | 726/15 |
| 8,316,435 | B1 * | 11/2012 | Varadhan et al. | 726/15 |
| 8,661,556 | B2 * | 2/2014 | Smith | 726/28 |
| 8,788,661 | B2 * | 7/2014 | Raleigh | 709/224 |
| 8,875,223 | B1 * | 10/2014 | Chen et al. | 726/1 |
| 8,934,344 | B2 * | 1/2015 | Memon et al. | 370/235 |
| 8,955,100 | B2 * | 2/2015 | Varadhan et al. | 726/15 |
| 8,959,139 | B2 * | 2/2015 | Medved et al. | 709/203 |
| 8,964,748 | B2 * | 2/2015 | Cervantes | 370/392 |
| 9,001,671 | B2 * | 4/2015 | McDysan et al. | 370/242 |
| 9,009,349 | B2 * | 4/2015 | Narayanan et al. | 709/238 |
| 9,038,151 | B1 * | 5/2015 | Chua et al. | 726/6 |
| 2008/0049752 | A1 * | 2/2008 | Grant | 370/392 |
| 2008/0291915 | A1 | 11/2008 | Foschiano | |

(Continued)

OTHER PUBLICATIONS

Hardware primitives for packet flow processing architectures Finochietto, J.M.; Paz, S.; Zerbini, C. Programmable Logic (SPL), 2011 VII Southern Conference on DOI: 10.1109/SPL.2011.5782622 Publication Year: 2011, pp. 37-43.*

(Continued)

*Primary Examiner* — Michael B Holmes
(74) *Attorney, Agent, or Firm* — Edell, Shapiro & Finnan, LLC (57) ABSTRACT

Presented herein are probabilistic flow management techniques in which flow objects are probabilistically evaluated in view of the current contents of a flow table to determine if the flow object should be added to the flow table. An untrusted packet flow may be received at a feature or function of a networking device. The feature initiates addition of an untrusted flow object corresponding to the untrusted packet flow into a flow table. A probabilistic flow management mechanism determines if the number of untrusted flow objects in the flow table is below a predetermined lower limit. If the number of untrusted flow objects exceeds the lower limit and prior to addition of the untrusted flow object into the flow table, the probabilistic flow management mechanism probabilistically determines if the untrusted flow object may be added to the flow table.

23 Claims, 4 Drawing Sheets

(56) References Cited

U.S. PATENT DOCUMENTS

2012/0079478 A1    3/2012    Galles et al.
2012/0287930 A1    11/2012   Raman
2013/0073743 A1    3/2013    Ramasamy et al.
2014/0365418 A1*   12/2014   Grant .............................. 706/52

OTHER PUBLICATIONS

The NetScript active network system da Silva, S.; Yemini, Y.; Florissi, D. Selected Areas in Communications, IEEE Journal on vol. 19, Issue: 3 DOI: 10.1109/49.917713 Publication Year: 2001, pp. 538-551.*

Safe Loading—A Foundation for Secure Execution of Untrusted Programs Payer, M.; Hartmann, T.; Gross, T.R. Security and Privacy (SP), 2012 IEEE Symposium on Year: 2012 pp. 18-32, DOI: 10.1109/SP.2012.11.*

A Socially-Aware Operating System for Trustworthy Computing Oliveira, D.; Murthy, D.; Johnson, H.; Wu, S.F.; Nia, R.; Rowe, J. Semantic Computing (ICSC), 2011 Fifth IEEE International Conference on Year: 2011 pp. 380-386, DOI: 10.1109/ICSC.2011.45.*

Intrusion detection in distributed systems, an approach based on taint marking Hauser, C.; Tronel, F.; Fidge, C.; Me, L. Communications (ICC), 2013 IEEE International Conference on Year: 2013 pp. 1962-1967, DOI: 10.1109/ICC.2013.6654811.*

Proposal of an Adaptive Firewall System in Collaboration with Extended DNS Yong Jin; Yamai, N. Applications and the Internet (SAINT), 2011 IEEE/IPSJ 11th International Symposium on Year: 2011 pp. 222-225, DOI: 10.1109/SAINT.2011.40.*

* cited by examiner

PROBABILISTIC FLOW MANAGEMENT

TECHNICAL FIELD

The present disclosure relates to packet flow processing in a networking device.

BACKGROUND

In computer networks, data is transmitted in the form of packets (sometimes referred to as datagrams, segments, blocks, cells or frames) from a source to a destination via networking devices (e.g., routers, switches, etc.). A sequence of packets transmitted from a source to a destination is referred to as a network or packet flow.

Certain networking devices include hardware and/or software features that are configured to process (i.e., perform operations with or on) a packet flow that passes through the networking device. These networking device features may include, for example, a firewall feature, a Network Address Translation (NAT) feature, a flow export feature, etc.

DESCRIPTION OF EXAMPLE EMBODIMENTS

Overview

Presented herein are probabilistic flow management techniques in which flow objects are probabilistically evaluated in view of the current contents of a flow table to determine if the flow object should be added to the flow table. An untrusted packet flow may be received at a feature or function of a networking device. The feature initiates addition of an untrusted flow object corresponding to the untrusted packet flow into a flow table. In general, this occurs on the first packet of the flow. A probabilistic flow management mechanism determines if the number of untrusted flow objects in the flow table is below a predetermined lower limit. If the number of untrusted flow objects exceeds the lower limit and prior to addition of the untrusted flow object into the flow table, the probabilistic flow management mechanism probabilistically determines if the untrusted flow object may be added to the flow table.

Example Embodiments

Figure 1:
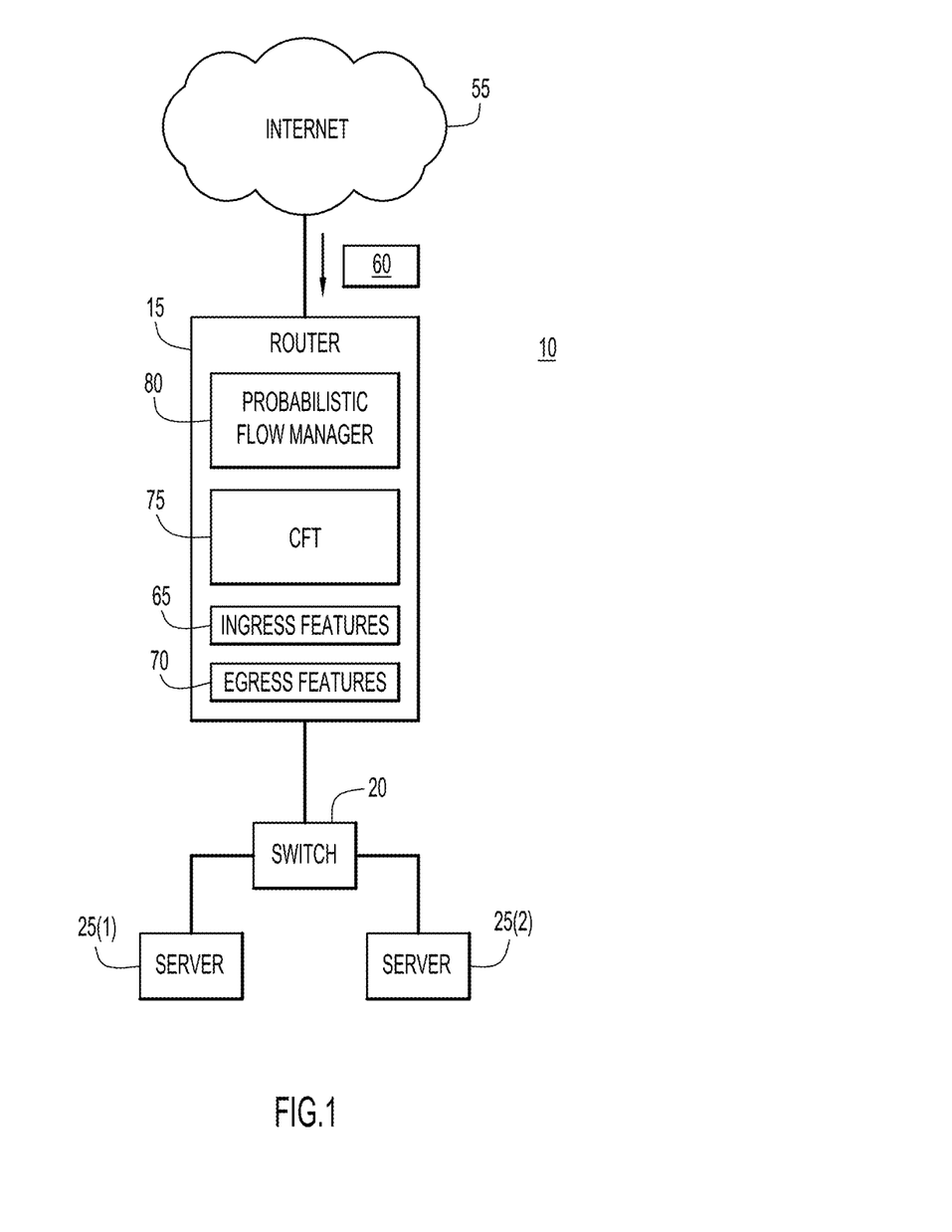
FIG. 1 is a block diagram of an example computing network having a networking device configured to implement probabilistic flow management techniques in accordance with examples presented herein.

FIG. 1 is a block diagram of a computing network 10. As shown, network 10 comprises a router 15, switch 20, and servers 25(1) and 25(2). It is to be appreciated that the network 10 of FIG. 1 is merely one example and that other network configurations are possible.

In the example network 10, data is transmitted in the form of packets, and a sequence of packets associated with common packet parameters (source address, destination address, etc.) is referred to as a packet flow. Router 15 and switch 20 are configured to bi-directionally transfer packet flows between the servers 25(1)/25(2) and the Internet 55. That is, router 15 and switch 20 are configured to direct packets received over the Internet 55 to servers 25(1) or 25(2), as well as to direct packets generated by servers 25(1) or 25(2) to destination devices via the Internet 55. FIG. 1 illustrates a packet flow graphically depicted at reference numeral 60 that is received by router 15 from the Internet 55.

Router 15 is a networking device that functions as the edge device for communication over the Internet 55. In other words, router 10 is the device that receives packets from, or forwards packets to, other devices over the Internet 55. Switch 20 is a networking device that uses a combination of hardware and/or software to direct packets to one or both of servers 25(1) and 25(2). In certain circumstances, router 15 and/or switch 20 may include various hardware and/or software features that are configured to process a packet flow. For example, router 15 may include a firewall feature designed to prevent (e.g., drop packets of) certain communications based on network policies. Router 15 may also include network address translation (NAT) features, flow export features filtering features, etc.

In general, the hardware/software features of a networking device, such as router 15, may be executed at an ingress (input) interface of the router or at an egress (output) interface of the router. Features executed at an ingress interface are shown in FIG. 1 as ingress features 65, while features executed at an egress interface are shown as egress features 70.

As shown in FIG. 1, the router 15 includes a common flow table (CFT) 75. The CFT 75 is, essentially, a hash-table that stores flow objects representing packet flows transiting through the router 15. Flow objects in the CFT 75 are indexed using, for example, their associated 5- or 6-tuple (e.g., source IP address, destination IP address, source port number, destination port number, protocol, etc). The CFT 75 is made available to and shared by the various ingress and egress features of router 15, also referred to herein as CFT clients. A flow object stored within the hash CFT 75 may be common to all CFT clients, which then have the ability to attach their own feature specific state. When a flow is added to the CFT 75, memory for the corresponding flow object will need to be allocated. The memory allocation can be considered the flow object "creation" event.

In conventional systems, an ingress or egress feature may receive a first packet of a packet flow that is to be processed by that feature. As a result, the feature may attempt to create a flow object in (i.e., add a new flow object to) an associated CFT. However, as noted above, all of the various ingress and egress features of a networking device share the same CFT. As such, in conventional networking devices, there is a potential that one feature may overwhelm the CFT by adding a large number of flow objects to the CFT, thereby substantially or entirely filling the CFT. This characteristic of conventional devices that a single feature is able to fill a CFT may be exploited during, for example, a denial-of-service (DoS) attack so as to effectively suspend service at the networking device.

More specifically, a firewall is a feature that is generally enabled to prevent certain packets or packet flows from passing through the router. However, certain features may be executed prior to execution of the firewall feature. As such, under a DoS attack at a conventional networking device, these pre-firewall features could consume the shared CFT such that the firewall can no longer add flow objects to the CFT. The firewall feature responds to such an event by denying all service through the router until the firewall feature is able to add entries to the CFT.

Conventional networking devices may address DoS attacks in several ways. More specifically, certain conventional network devices may implement schemes that simply drop or forward all the packets in the event the CFT becomes full. Such drop or forward schemes are unsophisticated and may still render the network device useless or compromise security. Other conventional network devices may implement source/destination address based session limits that require specific configuration and some knowledge of the DoS attack profile. Still other conventional network devices may implement protocol specific flow limits that similarly require specific configuration. Such schemes likely result in an under-utilized flow table. Again, it can be difficult to tune these parameters in the face of all threats, and will generally result in a conservative configuration. Finally, other conventional network devices may attempt to "walk" the flow table to identify flows to be aged out. The nature of a DoS attack is that single packet flows can fill the flow table. If too few packets have been seen on the flow, aggressive aging parameters can be applied. The drawback of this approach is that it will consume a greater proportion of the device computing resources (e.g., central processing unit resources) to walk the flow table and find these flows.

Presented herein are probabilistic flow management techniques designed to reduce or eliminate DoS attacks resulting from the shared CFT infrastructure without the need for specific configuration, knowledge of the DoS attack profile, walking the flow table, or compromising security by simply dropping or forwarding all packets. In essence, in accordance with the probabilistic flow management techniques, pre-firewall features of router 15 are regulated in a probabilistic manner so as to prevent such features from overwhelming the CFT 75. As described further below, the pre-firewall features are regulated by a probabilistic flow manager (probabilistic flow management mechanism) 80.

Figure 2:
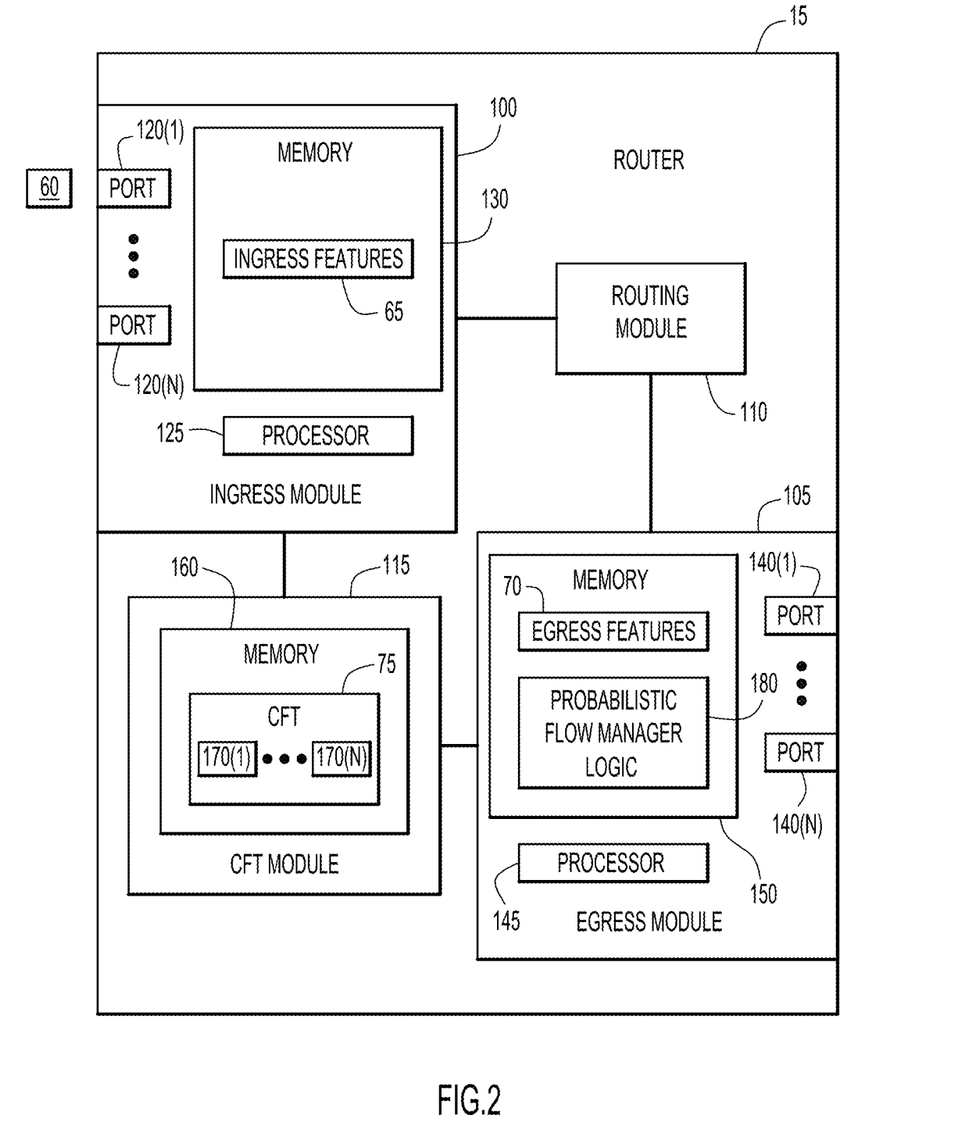
FIG. 2 is a block diagram of an example router configured to implement the probabilistic flow management techniques.

FIG. 2 is a block diagram of one arrangement of router 15 from FIG. 1 in accordance with examples presented herein. As shown, router 15 comprises an ingress module 100, an egress module 105, a routing module or fabric 110, and a CFT module 115.

Ingress module 100 comprises a plurality of network ports 120(1)-120(N), a processor 125, and a memory 130. Memory 130 comprises one or more ingress features 65. The egress module 105 comprises a plurality of network ports 140(1)-140(N), a processor 145, and a memory 150. Memory 150 comprises one or more egress features 70 and probabilistic flow manager logic 180. CFT module 115 comprises a memory 160 that includes a CFT 75. CFT 75 is configured to store a plurality of flow objects 170(1)-170(N) created by the ingress features 5 or the egress features 70. Routing module 110 is configured to route packets among the network ports (i.e., ports 120(1)-120(N) and ports 140(1)-140(N)).

Memories 130, 150, and 160 may comprise read only memory (ROM), random access memory (RAM), magnetic disk storage media devices, optical storage media devices, flash memory devices, electrical, optical, or other physical/tangible memory storage devices. The processors 125 and 145 are, for example, microprocessors or microcontrollers that execute instructions for the ingress features 65 (processor 125), egress features 70 (processor 145), and probabilistic flow manager logic 180 (processor 145). Thus, in general, the memories 130 and 150 may comprise one or more tangible (non-transitory) computer readable storage media (e.g., a memory device) encoded with software comprising computer executable instructions and when the software is executed (by a respective processor) it is operable to perform the operations described herein in connection with the ingress features 65, egress features 70, and probabilistic flow manager logic 180.

For ease of reference, examples will be described here with reference to a probabilistic flow manager (probabilistic flow management mechanism) 80 that performs various operations. It is to be appreciated that, in practice, such references to operations of the probabilistic flow manager 80 or a probabilistic flow management mechanism refer to operations of the processor 145 executing probabilistic flow manager logic 180.

FIG. 2 is described with reference to an example in which packet flows enter the router 15 at the ports 120(1)-120(N) and in which the packet flows exit the router 15 at ports 140(1)-140(N). It is to be appreciated that router 15 may be used in other examples in which packet flows enter the router at ports 140(1)-140(N) and exit the router 15 at ports 120(1)-120(N). As such, the use of the terms "ingress" and "egress" to refer the modules 110 and 105, respectively, is merely for convenience and is not intended to limit the operation of those modules.

Although only one example arrangement of router 15 is shown, it is to be appreciated that techniques described herein may also be implemented in other arrangements. Additionally, the various modules 100, 105, 110, and 115 may each be implemented, for example, in one or more application specific integrated circuits (ASICs). It is to be appreciated that the various modules 100, 105, 110, and 115 may not be mutually exclusive. For example, in certain embodiments, the probabilistic flow manager 80 may be implemented as part of the ingress module 100, as a separate module, or may span multiple modules. It is to be appreciated that techniques described herein may be implemented in different types of network devices, such as, for example, switches, stand-alone firewalls, etc.

Furthermore, FIG. 2 primarily illustrates a software implementation of ingress features 65, egress features 70, and probabilistic flow manager 80 (i.e., as probabilistic flow manager logic 180). It is to be appreciated that this software implementation of FIG. 2 is merely one example and that ingress features 65, egress features 70, and probabilistic flow manager 80 may implemented partially or fully in hardware.

Returning to the example of FIG. 2, a packet flow 60 is received at port 120(1) of the ingress module 100. Subsequently, a feature of router 15 (e.g., ingress features 65 and/or egress features 70) initiates processing of the packet and initiates an attempt to add a flow object entry corresponding to the packet flow 60 into the CFT 75. In accordance with examples presented herein, before a feature is allowed to add the flow object to the CFT 75, the probabilistic flow manager 80 (probabilistic flow management mechanism) probabilistically evaluates the untrusted flow in view of the current contents of the CFT 75 to determine if the untrusted flow object should be added.

More specifically, the probabilistic flow manager 80 may first determine whether the packet flow 60 corresponding to the flow object (i.e., the packet flow that results in the feature's attempt to create a flow object) is a "trusted" flow or an "untrusted" flow. A trusted flow is a packet flow that has been permitted by the firewall feature 136 or a packet flow in which the packet originating the flow must transit from ingress to egress without being dropped. For example, certain packets may be successfully processed by, for example, some ingress features and then dropped by NAT if there is no translation (e.g., packets coming from the Internet and ingress on a NAT outside interface). Such flows would not be considered trusted. An untrusted flow is any flow that does not satisfy the criteria to be a trusted flow. In general, trusted flows are given favored treatment in the router 15 such that when a trusted flow is received by a feature, the feature can create a trusted flow object in CFT 75. However, the number of untrusted flow objects (i.e., flow objects corresponding to untrusted flows) that may be added to the CFT 75 is limited in a probabilistic manner that is described further below. Once the limit of untrusted flow objects in the CFT 75 has been reached, new untrusted flow objects cannot be created.

The following describes the probabilistic approach implemented by probabilistic flow manager 80 for limiting the number of untrusted flow objects that may be created in CFT 75. This description makes reference to a number of different abbreviations, each of which are first defined below as:

Fmax—Maximum number of total flow objects (trusted and untrusted) supported by CFT 75;

u—Number of untrusted flow objects in the CFT 75;

t—Number of trusted flow objects in the CFT 75;

f—Number of currently active flow objects in CFT 75 (f=u+t);

L—Lower limit of untrusted flow objects that triggers probabilistic flow determination;

L'—Maximum limit of untrusted flow objects (L and L'<Fmax and L<L');

Tdefault—Default flow object aging setting (e.g., 7 seconds); and

Tmin—Minimum aging setting (e.g., 1 second).

The flow object management approach implemented by probabilistic flow manager 80 applies a probability curve to randomly determine whether an untrusted flow object should be created. However, the probability curve is only used when the number of untrusted flows in the CFT 75 exceeds the lower limit L. That is, when the number of untrusted flow objects in the CFT 75 is below the lower limit L, the probabilistic flow manager 80 will allow a new untrusted object to be created without a probability evaluation. However, when the number of untrusted flow objects in the CFT 75 exceeds the lower limit L, the probabilistic flow manager 80 will implement a probability evaluation. The probability evaluation calculates a probability that an untrusted flow object should be created once the limit of untrusted flow objects has been exceeded.

Figure 3:
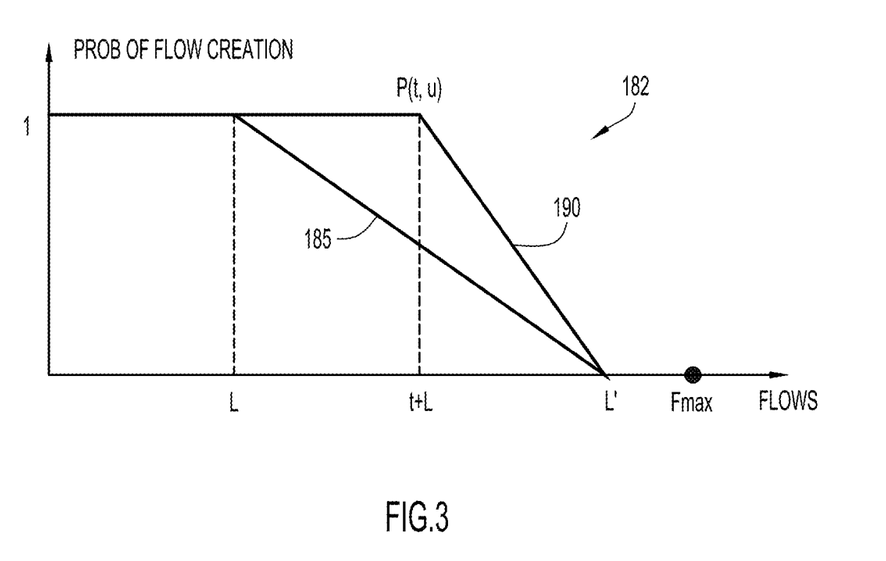
FIG. 3 is a graph illustrating two probabilistic curves in accordance with examples presented herein.

FIG. 3 illustrates a graph 182 of two probability curves 185 and 190 that may be used in a probability evaluation in accordance with examples presented herein. The probability curve 185 corresponds to a system having only untrusted flow objects present, while probability curve 190 corresponds to a system that includes untrusted and trusted flow objects. In the example of FIG. 3, the X-axis of the graph presents a number of flows, while the y-axis represents the probability that a flow will be created, where 1 is equivalent to a 100% success rate.

In accordance with the examples of FIG. 3, if untrusted flow objects continue to be added beyond the limit L, the probability of successful flow object creation decreases. If the system has some trusted flows t (shown in curve 190), it is only when the untrusted flow object limit is exceeded that the probability decreases from the knee at t+L. The probability curve has an absolute upper limit L'≤FMax to the number of untrusted flows. This can guarantee that Fmax−L' trusted flow objects can always be created.

A specific counter may not be needed to determine the number of untrusted flows. Rather, the number of untrusted (and trusted) flows may be sampled at the time a feature attempts to create a flow object.

In accordance with the probabilistic flow management techniques presented herein, when an untrusted flow is identified, the probabilistic flow management mechanism generates a pseudo-random number (r) in the range of 0 to 1 [1, 0]. As used herein, pseudo-random includes generally or fully random numbers. This pseudo-random number is then compared to a point on a probability curve 185 or 190 corresponding to the current contents of the CFT. For example, using Equation 1 below, the probabilistic flow management mechanism determines a current point on a predetermined probability curve that corresponds to the number of untrusted flows and, if any are present, the number of trusted flows.

$$P(t, u) = \begin{cases} 1, & u < L \\ \frac{L' - (t+u)}{L' - (t+L)}, & u \geq L \\ 0, & L' - (t+L) \leq 0 \text{ or } L' \leq (t+L) \end{cases} \quad \text{Equation 1}$$

Equation 1 has several conditional options. More specifically, if u<L, then the probability is 1. If L'−(t+L)≤0 or L'≤(t+L), then the probability is zero. If u≥L, then probability varies.

If the random number r is less than or equal to P(t, u) (i.e., r≤P(t, u)), then a flow object may be created. In other words, if the pseudo-random number is a number that falls below the calculated point of the curves 185 or 190 in FIG. 3, then the corresponding flow object may be added to the CFT. However, if the pseudo-random number is a number that falls above the calculated point of the curves 185 or 190 in FIG. 3, then the corresponding flow object is not added to the CFT and the packets in the underlying packet flow are dropped.

To facilitate integer operations, a function may be used to normalize the pseudo-random number and curve point to the range (256, 0], as shown in below in Equation 2.

$$(\text{random32\&0xFF}) \leq (L'-(t+u))/(L'-(t+L))*256 \quad \text{Equation 2:}$$

Alternatively, to avoid using the divide instruction that is implemented in software the relation can be calculated as shown below in Equation 3.

$$(\text{random32\&0xFF})*(L'-(t+L)) \leq (L'-(t+u))*256 \quad \text{Equation 3:}$$

The limits L and L' are scaled from a maximum number of flows (Fmax) the system can support and may be set, in one example, as follows:

L=25% of Fmax

L'=75% of Fmax.

Different flows will consume different amounts of memory based on the number of features that attach state information thereto and based on the size of the state information. The CFT provides the maximum bytes available and the number of bytes used by all flows. In one example, the memory policing will be kept simple, and untrusted flows will be prevented if:

used_bytes>50% of max_available_bytes

In a router or other networking device that implements CFT, it is likely the flow objects will be created by ingress features that first "touch" the underlying packet flows. In the case of a firewall that runs as an egress feature, it is possible to at least temporarily create the untrusted flow objects at the ingress feature. Once the firewall permits the underlying packet flow, the temporary untrusted flow object is promoted to a trusted flow object. However, if the firewall denies the underlying flow, the packets are dropped and the temporary flow object is deleted. In other words, the flow is allowed to be created at ingress in the event that the firewall eventually determines the flow to be trusted, ensuring the flow had the full feature processing at the ingress. The firewall will manage the setting of the trusted/untrusted status of the flow, and the deleting of the flow if the untrusted limit is exceeded. This may utilize additional computing power, but all ingress features could then create and operate on the flow.

One advantage of the probabilistic approach is that when the CFT 75 fills to capacity, the probabilistic flow manager 80 can control the number of untrusted flows in the table. For example, setting L=0 means there will be increasing bias to delete the untrusted flows immediately as more trusted flows are added. In an ideal situation, the CFT 75 would be filled to capacity with trusted flow objects only.

The concept of trusted and untrusted flows allows for different flow age settings to be applied to the different flow classes at the time of flow creation. All untrusted flows might be given a minimum flow age Tmin when they are created. This would ensure that the untrusted flows are aged out of the flow-table aggressively. In the event the firewall promotes the flow to be trusted, the flow age could be reset to some longer default time out Tdefault.

In a DoS attack, it may be desirable to find the untrusted flows and clear them so that new trusted flows might be created. This clearing may occur even if the untrusted flow limit has not been reached. The exact means of clearing the flows might involve deleting them immediately, or resetting their ager limit to be Tmin.

Figure 4:
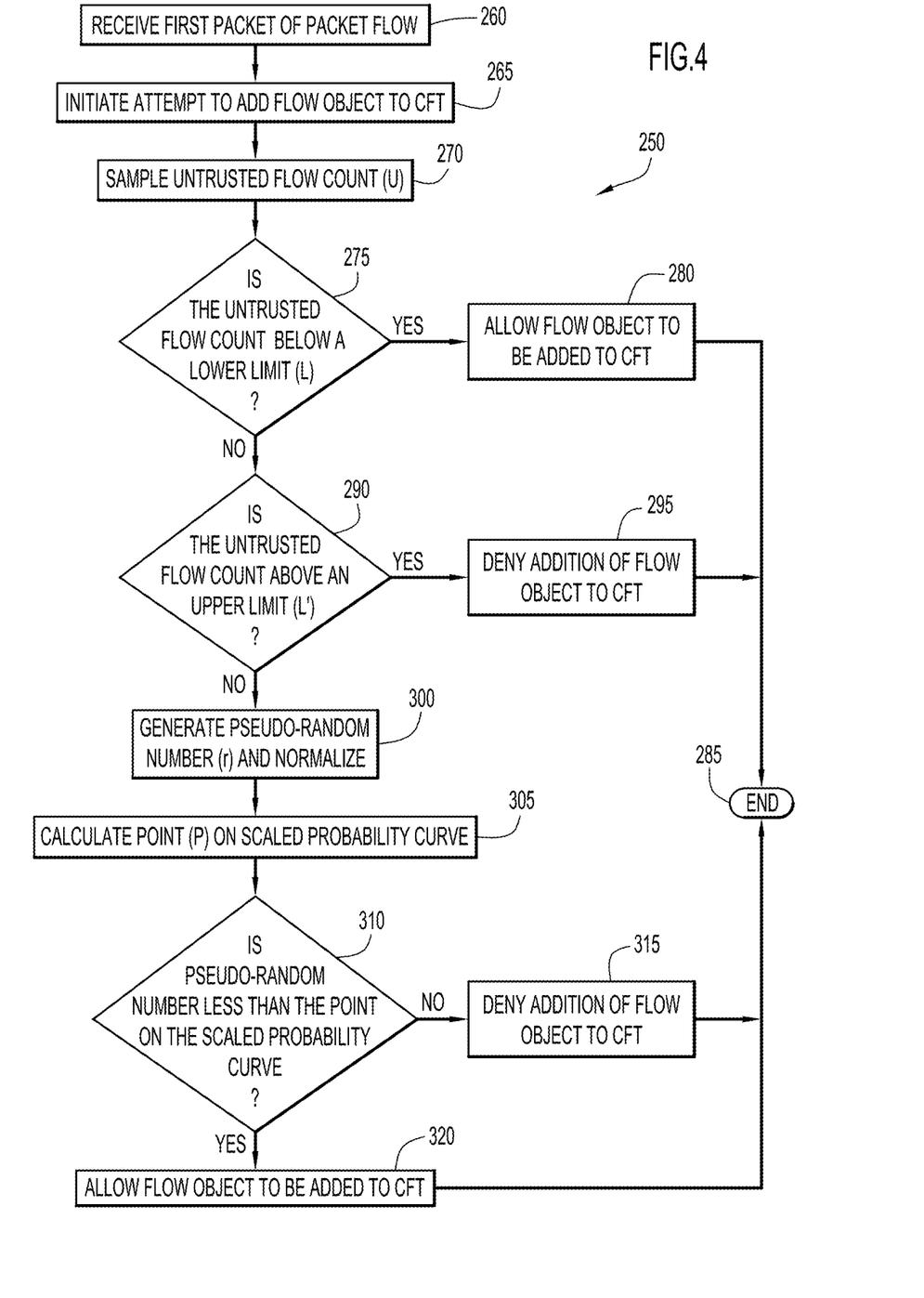
FIG. 4 is a detailed flowchart of a method for probabilistic flow management in accordance with examples presented herein.

FIG. 4 is a detailed flowchart of a method 250 for management of an untrusted flow in accordance with examples presented. Method 250 begins at 260 where the first packet of the untrusted flow is received at a networking device feature (e.g., ingress or egress feature). At 265, the networking device feature attempts to add a flow object corresponding to the received untrusted packet flow to a CFT.

As noted above, before an untrusted flow object is added to a CFT, a probabilistic flow manager (probabilistic flow management mechanism) probabilistically evaluates the untrusted flow in view of the current contents of the CFT to determine if the untrusted flow object should be added. More specifically, as shown in FIG. 4, at 270 the probabilistic flow management mechanism samples an untrusted flow count(u) (i.e., determines the number of untrusted flows in the CFT). At 275, the probabilistic flow management mechanism determines if the untrusted flow limit is below a predetermined lower limit (L). If the untrusted flow count is below this lower limit, then at 280 the untrusted flow object may be added to the CFT and the method ends at 285 (i.e., memory is allocated for the flow object). However, if the untrusted flow count is above this lower limit, then the method proceeds to 290.

At 290, the probabilistic flow management mechanism determines if the untrusted flow count is above a predetermined upper limit (L'). If the untrusted flow count is above this upper limit, then at 295 the untrusted flow object is denied addition to the CFT (i.e., no memory is allocated for the flow object) and the packets in the packet flow are dropped. The method then ends at 285. However, if the untrusted flow limit is below this upper limit, then the method proceeds to 300.

At 300, the probabilistic flow management mechanism generates a pseudo-random number (r) and normalizes the number for integer operation. At 305, a point on a scaled probability curve is calculated based on the current contents of the CFT. For example, using Equation 1 above, the probabilistic flow management mechanism determines a current point on a predetermined probability curve that corresponds to the current contents of the CFT (i.e., the number of untrusted flows and, if any are present, the number of trusted flows).

At 310, a determination is made as to whether or not the pseudo-random number is less than the calculated point on the scaled probability curve (i.e., whether the pseudo-random number falls below the probability curve at the point corresponding to the current contents of the CFT). If the pseudo-random number is not less than the calculated point, then at 315 untrusted flow object is denied addition to the CFT and the CFT client feature attempting to create the flow cannot function. In certain examples, the packets may be dropped. The method ends at 285. If the pseudo-random number is less than the calculated point, then at 320 the untrusted flow object may be added to the CFT and the method ends at 285.

Techniques presented herein have primarily been described with reference to the use of "trusted" and "untrusted" flows. It is to be appreciated that the notion of "trusted" versus "untrusted" is not necessarily a binary determination and gradations may be introduced. That is, the techniques presented herein may use intermediate levels of trust and different probability curves may be applied at the different trust levels. For example, with multiple levels of trust, the system could pre-designate feature priority (e.g., NAT at a first intermediate level of priority, and application recognition at a second intermediate priority level). By using different trust levels, the individual features have their own curves (providing different probabilities of whether the feature can add a flow object to a CFT) which, in essence, prioritizes access to the CFT between the various features.

To summarize, presented herein are probabilistic flow management techniques to control flow object creation in a CFT so as to counter DoS attacks. The probabilistic approach maximizes utilization of a CFT between different classes of flows (i.e., trusted and untrusted) so that one class of flows may be biased relative to another class without resorting to hard limits The use of the probabilistic approach avoids the need to implement potentially damaging schemes that simply drop or forward all the packets in the event the CFT becomes full. Such drop or forward schemes are unsophisticated and may still render the network device useless or compromise security. The probabilistic approach also avoids source/destination address based session limits that require specific configuration and some knowledge of the DoS attack profile. Such schemes are, in essence, reactive in nature and are not self preserving in nature like the probabilistic approach. Additionally, protocol specific flow limits similarly require specific configuration. These will likely result in an under-utilized flow-table. Again it can be difficult to tune these parameters in the face of all threats, and will generally result in a conservative configuration. Finally, as the size of the flow tables increases with memory capacity, it may not be effective to walk the flow table and look for flows to be aged out. The nature of a DoS attack is that single packet flows can fill the flow table. If too few packets have been seen on the flow, aggressive aging parameters can be applied. The drawback of this approach is that it will consume a greater proportion of the device resources to walk the flow table and find these flows. It is computationally simpler to randomly determine whether an untrusted flow should be created before it is added to the flow table.

The above description is intended by way of example only.

What is claimed is:
1. A method comprising:
receiving an untrusted packet flow at a networking device;
initiating addition of an untrusted flow object corresponding to the untrusted packet flow into a flow table;
determining if the number of untrusted flow objects in the flow table is below a predetermined lower limit; and if the number of untrusted flow objects exceeds the lower limit and prior to addition of the untrusted flow object into the flow table, probabilistically determining if the untrusted flow object may be added to the flow table.

2. The method of claim 1, further comprising:
if the number of untrusted flow objects in the flow table is below the lower limit, allowing the untrusted flow object to be added to the flow table.

3. The method of claim 1, further comprising:
determining if the number of untrusted flow objects in the flow table exceeds a predetermined upper limit; and
if the number of untrusted flow objects in the flow table exceeds the upper limit, denying addition of the untrusted flow object to the flow table.

4. The method of claim 1, wherein probabilistically determining if the untrusted flow object may be added to the flow table comprises:
generating a pseudo-random number;
calculating a point on a probability curve; and
comparing the pseudo-random number to the point on the probability curve to determine if the untrusted flow object may be added to the flow table.

5. The method of claim 4, wherein calculating a point on a probability curve comprises:
determining a point on the probability curve corresponding to the current contents of the flow table.

6. The method of claim 5, wherein calculating a point on a probability curve comprises:
determining a point on the probability curve according to:

$$P(t, u) = \begin{cases} 1, & u < L \\ \dfrac{L' - (t+u)}{L' - (t+L)}, & u \geq L \\ 0, & L' - (t+L) \leq 0 \text{ or } L' \leq (t+L) \end{cases}$$

where
u is the number of untrusted flow objects in the flow table,
t is the number of trusted flow objects in the flow table,
L is the lower limit of untrusted flow objects in the flow table, and
L' is the maximum limit of untrusted flow objects in the flow table.

7. The method of claim 4, further comprising:
if the pseudo-random number is lower than the point on the probability curve, allowing the untrusted flow object to be added to the flow table; and
if the pseudo-random number is higher than the point on the probability curve, denying addition of the untrusted flow object to the flow table.

8. The method of claim 1, further comprising:
classifying a packet flow received at the networking device as a trusted packet flow or an untrusted packet flow.

9. An apparatus, comprising:
one or more network interface ports;
a memory; and
a processor coupled to the one or more network interface ports and the memory, and configured to:
receive an untrusted packet flow at a networking device;
initiate addition of an untrusted flow object corresponding to the untrusted packet flow into a flow table;
determine if the number of untrusted flow objects in the flow table is below a predetermined lower limit; and
if the number of untrusted flow objects exceeds the lower limit and prior to addition of the untrusted flow object into the flow table, probabilistically determine if the untrusted flow object may be added to the flow table.

10. The apparatus of claim 9, wherein the processor is further configured to:
if the number of untrusted flow objects in the flow table is below the lower limit, add the untrusted flow object to the flow table.

11. The apparatus of claim 9, wherein the processor is further configured to:
determine if the number of untrusted flow objects in the flow table exceeds a predetermined upper limit; and
if the number of untrusted flow objects in the flow table exceeds the upper limit, deny addition of the untrusted flow object to the flow table.

12. The apparatus of claim 9, wherein to probabilistically determine if the untrusted flow object may be added to the flow table, the processor is configured to:
generate a pseudo-random number;
calculate a point on a probability curve; and
compare the pseudo-random number to the point on the probability curve to determine if the untrusted flow object may be added to the flow table.

13. The apparatus of claim 12, wherein to calculate a point on a probability curve the processor is configured to:
determine a point on the probability curve corresponding to the current contents of the flow table.

14. The apparatus of claim 13, wherein to calculate a point on a probability curve the processor is configured to:
determine a point on the probability curve according to:

$$P(t, u) = \begin{cases} 1, & u < L \\ \dfrac{L' - (t+u)}{L' - (t+L)}, & u \geq L \\ 0, & L' - (t+L) \leq 0 \text{ or } L' \leq (t+L) \end{cases}$$

where
u is the number of untrusted flow objects in the flow table,
t is the number of trusted flow objects in the flow table,
L is the lower limit of untrusted flow objects in the flow table, and
L' is the maximum limit of untrusted flow objects in the flow table.

15. The apparatus of claim 13, wherein the processor is further configured to:
if the pseudo-random number is lower than the point on the probability curve, add the untrusted flow object to the flow table; and
if the pseudo-random number is higher than the point on the probability curve, deny addition of the untrusted flow object to the flow table.

16. The apparatus of claim 9, wherein the processor is further configured to:
classify a packet flow received at the networking device as a trusted packet flow or an untrusted packet flow.

17. One or more non-transitory computer readable storage media encoded with software comprising computer executable instructions and when the software is executed operable to:
receive an untrusted packet flow at a networking device;
initiate addition of an untrusted flow object corresponding to the untrusted packet flow into a flow table;
determine if the number of untrusted flow objects in the flow table is below a predetermined lower limit; and
if the number of untrusted flow objects exceeds the lower limit and prior to addition of the untrusted flow object into the flow table, probabilistically determine if the untrusted flow object may be added to the flow table.

18. The non-transitory computer readable storage media of claim 17, further comprising instructions operable to:
if the number of untrusted flow objects in the flow table is below the lower limit, allow the untrusted flow object to be added to the flow table.

19. The non-transitory computer readable storage media of claim 17, further comprising instructions operable to:
determine if the number of untrusted flow objects in the flow table exceeds a predetermined upper limit; and
if the number of untrusted flow objects in the flow table exceeds the upper limit, deny addition of the untrusted flow object to the flow table.

20. The non-transitory computer readable storage media of claim 17, wherein the instructions operable to probabilistically determine if the untrusted flow object may be added to the flow table comprise instructions operable to:
generate a pseudo-random number;
calculate a point on a probability curve; and
compare the pseudo-random number to the point on the probability curve to determine of the untrusted flow object may be added to the flow table.

21. The non-transitory computer readable storage media of claim 20, wherein the instructions operable to calculate a point on a probability curve comprise instructions operable to:
determine a point on the probability curve corresponding to the current contents of the flow table.

22. The non-transitory computer readable storage media of claim 21, wherein the instructions operable to calculate a point on a probability curve comprise instructions operable to:
determine a point on the probability curve according to:

$$P(t, u) = \begin{cases} 1, & u < L \\ \dfrac{L' - (t + u)}{L' - (t + L)}, & u \geq L \\ 0, & L' - (t + L) \leq 0 \text{ or } L' \leq (t + L) \end{cases}$$

where
u is the number of untrusted flow objects in the flow table,
t is the number of trusted flow objects in the flow table,
L is the lower limit of untrusted flow objects in the flow table, and
L' is the maximum limit of untrusted flow objects in the flow table.

23. The non-transitory computer readable storage media of claim 20, further comprising instructions operable to:
if the pseudo-random number is lower than the point on the probability curve, allow the untrusted flow object to be added to the flow table; and
if the pseudo-random number is higher than the point on the probability curve, deny addition of the untrusted flow object to the flow table.

* * * * *